United States Patent [19]

Boaz

[11] Patent Number: 4,501,099

[45] Date of Patent: Feb. 26, 1985

[54] STRUCTURE FOR A MODULAR GREENHOUSE AND THE LIKE

[76] Inventor: Premakaran T. Boaz, 16842 Yorkshire, Livonia, Mich. 48154

[21] Appl. No.: 402,027

[22] Filed: Jul. 26, 1982

[51] Int. Cl.³ .............................................. E04B 7/00
[52] U.S. Cl. ........................................ 52/82; 52/79.4
[58] Field of Search .................. 52/82, 199, 280, 79.4, 52/84, 85, 721, 202, 397; 47/17; 98/43 C, 59, 66 R; 403/172, 176, 217, 219

[56] References Cited

U.S. PATENT DOCUMENTS

| | | |
|---|---|---|
| 726,071 | 4/1903 | Kees . |
| 2,256,050 | 9/1941 | Hansen . |
| 2,356,768 | 8/1944 | Ladon ..................................... 52/82 |
| 2,706,538 | 4/1955 | Schumann ............................. 52/285 |
| 2,746,283 | 5/1956 | Abrams . |
| 2,959,256 | 11/1960 | Deam . |
| 3,302,547 | 2/1967 | Wasserman . |
| 3,305,255 | 2/1967 | Henderson . |
| 3,375,831 | 4/1968 | Serbus ..................................... 47/17 |
| 3,869,827 | 3/1975 | Anderson et al. . |
| 3,919,813 | 11/1975 | Beindorf ................................. 52/82 |
| 4,068,421 | 1/1978 | Marovich . |
| 4,092,812 | 6/1978 | Dashner et al. ................. 52/397 X |
| 4,114,336 | 9/1978 | Bechet et al. ....................... 403/172 |
| 4,173,855 | 11/1979 | Raptoplous . |
| 4,275,534 | 6/1981 | Porter ..................................... 52/82 |

FOREIGN PATENT DOCUMENTS

| | | | |
|---|---|---|---|
| 0812514 | 5/1937 | France ................................... 52/285 |
| 1062095 | 4/1954 | France ..................................... 52/82 |
| 0611480 | 6/1959 | Italy ..................................... 403/172 |
| 0682117 | 2/1965 | Italy ..................................... 52/280 |
| 0697406 | 9/1953 | United Kingdom ................... 52/82 |
| 1215133 | 12/1970 | United Kingdom ................... 47/17 |
| 2056518 | 3/1981 | United Kingdom ................. 52/79.4 |

Primary Examiner—Carl D. Friedman
Assistant Examiner—Naoko N. Slack
Attorney, Agent, or Firm—Steven L. Permut

[57] ABSTRACT

A modular greenhouse has Y-shaped vertical support members connected to roof supports and horizontal supports forming a frame for sealingly adhering glass panes thereto. The roof supports extend from a central annular ring member which has a controllable vent member which can be moved between an open and close position at the center of the roof. In addition, two adjacent vertical supports can mount a standard storm door for entrance into the greenhouse. The modular greenhouse can be adjoined to other modular greenhouse sections sharing two common vertical supports. An entranceway formed between the two common vertical supports provides passage between the two modular sections.

6 Claims, 10 Drawing Figures

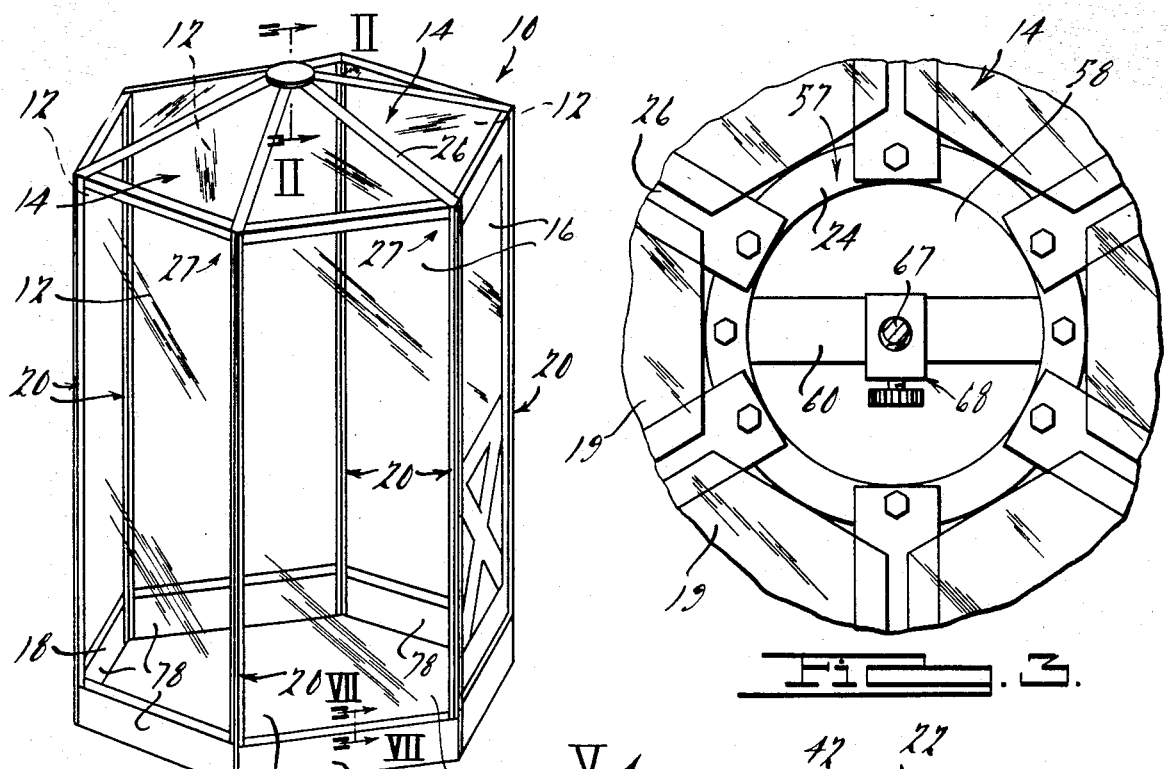

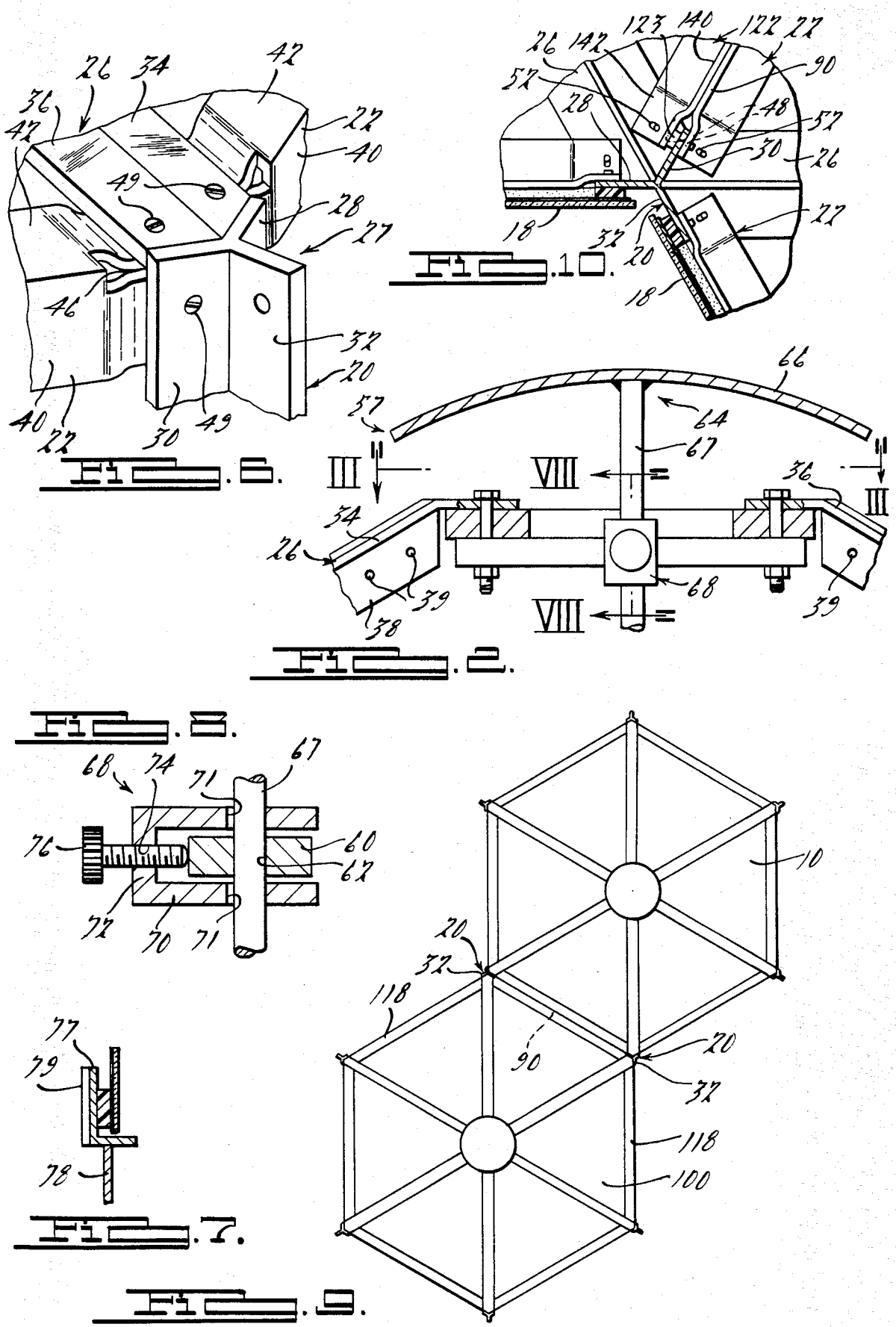

STRUCTURE FOR A MODULAR GREENHOUSE AND THE LIKE

BACKGROUND OF THE INVENTION

1. Field of the Invention.

This invention relates to frame structures, and more particularly, to frame structures for greenhouses.

2. Disclosure Information.

Portable and collapsible greenhouses have long been known. Various examples of greenhouses are disclosed in the U.S. Pat. Nos. 3,869,827 issued to Anderson et al on Mar. 11, 1975, and 4,068,421, issued to Marovich on Jan. 17, 1978. However, the Marovich greenhouse has specialized components such as curved molded transparent plastic sections which must be particularly adapted for this greenhouse. The Anderson reference discloses a greenhouse that is specifically manufactured to be foldable for portability.

It would be advantageous to have a frame structure for a greenhouse that can be assembled with a minimum amount of effort. It would also be advantageous to have such a frame structure that can adhere flat glass panes thereto.

SUMMARY OF THE INVENTION

According to the invention, a modular building has a frame structure for producing a hexagonal shaped interior. The modular building has six vertical supports. Each vertical support has a Y-shaped cross-section defined by three legs equally spaced apart from each other. The first and second legs of the vertical support form surfaces to which panels are secured. The third leg extends radially outward from the center of the hexagonal shaped building.

In addition, it is desired to have upper supports connected at their inner ends to a central ring member and radially extending outward therefrom to the vertical supports and forming the frame for a roof. The upper supports and the vertical supports are both connected at their outer and upper ends respectively to horizontal supports in a fashion that forms a frame having flush surfaces to which panels can be secured. The panels preferably are glass panes such that the building can function as a greenhouse.

It is desired to have strips of sealing material, for example butyl rubber tape, placed on these flush surfaces and having the glass panes sealingly adhered to the frame by the sealing material to form the walls and roof of the greenhouse. It is also preferred that each glass pane has a strip of opaque ceramic lining that adheres to the sealing material so as to conceal the sealing material from visual observation.

It is also desirable that the center ring member has a vent opening therethrough. The ring member is connected to a vent cover support. The vent cover support has an aperture therethrough for receiving a stem portion of the vent cover. The vent cover is sized to fully cover the vent opening when in a lowered position. The stem is operable to raise the cover to an open position. A fastener bracket assembly engages the stem and locks the stem in place to maintain the vent cover in the open position.

An adjacent pair of the vertical supports can, in addition, help support an adjacent modular building section. The two adjacent vertical supports have their third legs forming adhering surfaces for glass panes of the adjacent building section.

Also, in accordance with another aspect of the invention, the vertical, horizontal, and upper supports form a construction joint. Each horizontal support has first and second flanges meeting together at a common edge. The first flange is separated from the second flange by an axially extending slit at each end of each horizontal support. The end sections of the first and second flanges are offset inwardly a distance approximately equal to the thickness of the legs of the vertical supports and the upper supports respectively. The end section of the first flange abuts the inside surface of the leg and the end section of the second flange abuts the lower surface of the upper support. The vertical and upper supports are rigidly connected to the offset end sections of the respective flanges. When assembled together, the major central portion of the outer facing surface of the first flange is aligned with the outer facing surface of one leg of the vertical support. The major central portion of the upper facing surface of the second flange is aligned with the upper facing surface of the upper support. The aligned surfaces can form the aforementioned frame to which glass panes can be adhered.

With a structure according to the invention, a greenhouse can be inexpensively and easily assembled. Glass panes can be flushly mounted directly to the structural frame. The frame can also accomodate the installation of a conventional storm door between two adjacent vertical supports. The roof structure can also accomodate installation of a controllable vent. Furthermore, because the glass panes can incorporate a ceramic lining to cosmetically conceal sealing tape, the structure provides for a cosmetically desirable, as well as a functional, structure.

BRIEF DESCRIPTION OF THE DRAWINGS

Reference will now be made to the accompanying drawings in which:

FIG. 1 is a perspective view of an embodiment of a greenhouse according to the invention.

FIG. 2 is an enlarged cross-sectional view of the upper vent in the roof of the greenhouse taken along the line II—II shown in FIG. 1.

FIG. 3 is a cross-sectional plan view of the roof structure taken along line III—III as shown in FIG. 2.

FIG. 4 is an enlarged fragmentary plan view of one of the corners of the greenhouse.

FIG. 5 is a cross-sectional view taken along line V—V, shown in FIG. 4.

FIG. 6 is an enlarged perspective view illustrating one of the corner joints of the greenhouse.

FIG. 7 is a view taken along the line VII—VII shown in FIG. 1.

FIG. 8 is a view taken along the line VIII—VIII shown in FIG. 2.

FIG. 9 is a plan view illustrating how two building modules can be structurally interconnected to form an enlarged greenhouse.

FIG. 10 is a fragmentary enlarged bottom plan view showing abutting horizontal supports shown in FIG. 9 attached to a vertical support and roof support.

DETAILED DESCRIPTION OF THE PREFERRED EMBODIMENT

Referring now to the drawings, particularly FIG. 1, we see the greenhouse 10 that has a generally hexagonal shape with five sides comprising of walls 12, a sixth side comprising a standard storm door 16, and a roof 14. The greenhouse walls 12 include kick panels 78 and glass panes 18 secured to two vertical support members 20. The glass panes are also secured at the top to a horizontal support 22. The vertical support members 20 extend down below the groundline to serve as anchors for the greenhouse. The roof 14, as shown more clearly in FIGS. 1 and 3, has a central ring member 24. Roof supports 26 have inner ends attached thereto and radially extend downwardly and outwardly therefrom.

The supports 20, 22, 26, and ring 24 form in part the frame of the greenhouse 10. The vertical support members 20, horizontal supports 22 and roof supports 26 are connected together to form joints 27 located at the upper outer corners of the greenhouse 10. Reference will be made to only one of the vertical supports 20, horizontal supports 22, roof supports 24, forming joint 27. It is noted that the other supports 20, 22, and 26 are identical to the described supports. Each support 20, 22 and 26 is more specifically shown in FIGS. 4 and 6. As shown in FIG. 4, the vertical support 20 is basically Y-shaped in cross-section and includes three legs 28, 30, and 32 equally spaced apart from each other. The roof support 26 has two upper inclined flanges 34 and 36 and a vertically downwardly extending lower flange 38. Lower flanges 38 have a series of small apertures 39 as shown in FIG. 2 which can receive hooks for hanging plants within the interior of the greenhouse. The outer end of flanges 34 and 36 abut the inside surfaces of legs 28 and 30 respectively. The horizontal support member 22 is basically L-shaped in cross-section with a vertically downwardly extending flange 40 and an inclined top flange 42 which extends inwardly and upwardly. Each end section 44 of the horizontal support member 22 has flanges 40 and 42 separated from each other by a slit 46. The flanges 40 and 42 at the end sections 44 are offset and positioned to abut the inside surface of leg 28 and flange 40 respectively. A flathead bolt 49 passes through aperture 47 within the leg 28 and slot 48 through flange 40. A second flathead bolt 49 passes through aperture 50 in flange 34 and slot 52 in flange 42. The bolts are countersunk in order not to disturb the flat outer surface of leg 28 and the flat upper surface of flange 34.

As shown in FIGS. 4 and 6, the end section 44 of horizontal support 22 has the flange sections 40 and 42 offset a distance equal to the thickness of the leg 28 and flange 34 respectively. Consequently, the major central portions of flanges 40 and 42 have their outer and upper surfaces substantially aligned with the outer and upper surfaces of leg 28 and flange 34 respectively.

Similarly, leg 30 and flange 36 receive and are secured to an adjacent horizontal support 22 in the same described fashion to complete joint 27.

Referring back to FIG. 1, a lower cross-member 77 is attached to a lower portion of vertical support 20. As shown in more detail in FIG. 7, cross-member 77 is L-shaped in cross-section. Cross-member 77 has two end flaps 79 (only one is shown) that are bent inwardly for attachment to the inner surface of either leg 28 or 30 of vertical support 20. The kick board 78 is positioned below the cross-member 77 and is attached to the outer surface of legs 28 and 30.

Glass panes 18 are sealingly adhered to the outer surfaces of legs 28 and 30, flanges 40 of the horizontal supports 22, and the outer surface of lower cross member 77. Butyl rubber tape strips 54 are lined along the surfaces of the support members and cross-members.

Each pane 18 is pressed onto the strips 54 to become sealingly adhered to the supports and cross-members. Roof panes 19 are similarly sealingly adhered to the upper surfaces of the flanges 34 and 36 of the roof supports 26 and the upper surfaces of flanges 42 of the horizontal supports 22. In addition, pieces of butyl tape sealingly fill the slit 46 between flanges 40 and 42.

As shown in FIG. 5, the strip 54 of butyl can be cosmetically concealed by having the glass pane 18 bonded at its outer periphery to an opaque ceramic 56 in a conventional fashion. If a person is outside of the greenhouse 10, the person only sees the ceramic underneath the glass pane rather than the sealing strip 54. The structural support 22 conceals the butyl tape when a person is within the interior of the greenhouse 10. Similarly, support 20 conceals the tape from the inside perspective. The glass panes 19 can similarly be bonded to opaque ceramic. The supports 22 and 26 conceal the tape from the inside perspective and the ceramic conceals the tape from a top perspective.

Referring now to FIGS. 2 and 3, a vent generally indicated as 57 is provided at the center portion of the roof 14. The structural ring member 24 has a vent opening 58 therethrough. A cross-member 60 is attached to the underside of the ring member 24. The cross-member 60 has a center aperture 62 therethrough. A vent cover 64 has a dome shield 66 and a downwardly extending stem section 67 which is sized to extend through the aperture 62. The domed shield 66 is sized to cover the vent opening 58 and overlap the ring member 24 and the inner portions of the glass panes 19. An operator within the greenhouse can raise the stem 67 to open the vent. A fastener assembly generally indicated as 68 can lock the stem 67 in place. The fastener assembly 68 more specifically shown in FIG. 8 includes a U-shaped bracket member 70 having aligned apertures 71 therethrough which receive the stem 67 above and below the cross-member 60. The bight section 72 of the bracket member 70 has an aperture 74 which threadably engages turnscrew 76 which abuts the side of the cross-member. The turnscrew 76 can be turned to laterally move the bracket 70 such that its apertures 72 become offset with respect to the aperture 62. The edges of the apertures 72 and 62 will frictionally abut the stem 67 and lock it in place.

The storm door member 16, as shown in FIG. 1, has a conventional construction, i.e. it has its own frame for attachment to a door opening. The door's frame is secured to flange 40 of a horizontal support 22 and legs 28 and 30 of two adjacent vertical supports.

The modular greenhouse 10 can be easily adjoined to a similar greenhouse section 100 as shown in FIGS. 9 and 10. The adjoining greenhouse section 100 shares common vertical supports. The legs 32 of the shared vertical supports 20 are used to adhere glass panes 118. In addition, one of the horizontal supports 122 of greenhouse section 100 is inwardly and upwardly displaced. Spacer washers 123 position the support 122 inwardly. Slots 52 allow the inwardly displacement of support 122 while retaining engagement of bolts 49. Slot 48 allows the upwardly displacement of support 122. The slot 48 allows the upper flange 142 to be positioned flushly with the roof panes of greenhouse section 100, even though the support 122 is translationally moved inwardly with respect to roof support 126. Butyl tape is interposed between the two supports 22 and 122 to provide a seal against leakage. No glass pane is mounted between the two shared vertical supports 20 so that an entrance 90 is provided between the two sections 10 and 100. In addition, the second greenhouse section 100 would not need a door since it can be entered into via entrance 90. The rest of the greenhouse section 100 would be identical in construction to the originally described greenhouse section 10.

If desired, additional greenhouse sections can be adjoined in the same fashion to either the greenhouse section 10, 100 or both of them in the above described manner.

In this fashion, an efficient greenhouse can be constructed from easily manufactured frame structures such as extruded aluminum that can be assembled into a frame which can easily adhere glass panes, mount a standard storm door, and provide an effective vent at the center of its roof. The structure has a unique construction joint which allows for the glass panes to be flush against all the frame members to which it is sealingly adhered. The construction joint allows for easy assemblage of this greenhouse, which makes it ideal to market the greenhouse as a kit. The kit can be easily produced since there are a minimum number of different members to this greenhouse.

Variations and modifications of the presently described embodiments are possible without departing from the spirit and scope of the above described invention as defined in the appended claims.

The embodiments of the invention in which an exclusive property or privilege is claimed are defined as follows:

1. A modular building having a hexagonal shape comprising:
   six vertical supports having a Y-shaped cross-section formed from three legs equally spaced from each other;
   a first leg of each support forming an adhering surface for a panel of one side of the building;
   a second leg of each support forming an adhering surface for a panel of an adjacent side of the building;
   a third leg extending outward from the center of the building and forming an adhering surface for a panel;
   a panel being adhered to said first and second legs of two consecutive supports respectively forming a respective wall of the building;
   six roof supports connected together at their inner ends and radially extending outwardly therefrom;
   said roof supports having their outer ends in proximity to said first and second legs of said vertical supports;
   six horizontal supports having first and second flanges extending substantially at right angles to each other;
   said horizontal supports each having end sections where said first and second flanges are offset inwardly a thickness of said legs of said vertical support and a thickness of said roof support respectively and abutting inside surfaces of said respective leg and roof support such that outside surfaces of said leg and said first flange of said horizontal support are substantially coplaner at a sealing area defined thereon and the outside surfaces of said roof support and said second flange of said horizontal support are substantially aligned at a sealing area defined thereon;
   said legs of said vertical supports and said first flanges of said horizontal supports at said defined sealing area being constructed to adheringly support a set of glass panes; and
   said roof supports being constructed to adheringly support a second set of glass panes.

2. A modular building as defined in claim 1 further comprising;
   said six roof supports connected together at their inner ends to a central ring member and radially extending therefrom;
   said ring member having a vent opening therethrough;
   a vent cover support connected to said ring member and extending radially into said vent opening;
   said vent cover support having an aperture therethrough;
   a vent cover sized to cover said vent opening and having a stem portion passing through said aperture; and
   a fastener bracket engaged to said stem with a spacing means to offset said fastener with respect to said aperture through said vent cover support to frictionally lock said vent cover in a raised open position.

3. A construction joint for a greenhouse to provide flat and aligned adhering surfaces for adherence of glass panes thereto, said construction joint comprising;
   a first support formed from a first and second leg having a common edge;
   a second support having an outer end in proximity with inner walls of said first and second leg of said first support;
   a third and fourth support each having first and second flanges, said flanges having a common edge;
   said third and fourth support each having an end section where said first flange is separated from said second flange by an axially extending slit;
   said end sections of said first and second flanges being offset a distance equal to the thickness of said legs of said first support and a distance equal to the thickness of said second support respectively;
   said end sections of said first and second flanges of said third support abutting inside surfaces of said first leg and second support respectively, and said end sections of said first and second flanges of said fourth support abutting the inside surfaces of said second leg and said second support respectively such that outside surfaces of said legs and said first flange of said third and fourth supports are substantially coplanar at a sealing area defined thereon and the outside surfaces of said second support and said second flange of said third and fourth supports are substantially coplanar at a sealing area defined thereon.

4. A modular building having an hexagonal shape comprising;
   six vertical supports having a Y-shaped cross-section formed from three legs equally spaced from each other;
   one leg of each support forming an adhering surface for a panel of one side of the building;
   a second leg of each support forming an adhering surface for a panel of an adjacent side of the building;
   a third leg extending outward from the center of said building;
   six roof supports connected at their inner ends to a central ring member and radially extending therefrom;

said roof supports having their outer ends abutting said first and second legs of said vertical supports;

six horizontal supports having first and second flanges extending substantially at right angles to each other;

said horizontal supports each having end sections where said first flange is separated from said second flange by an axially extending slit;

said end sections of said first and second flanges being offset inwardly a thickness of said legs of said vertical support and a thickness of said roof support respectively and abutting inside surfaces of said respective leg and roof supports such that outside surfaces of said leg and said first flange of said horizontal support are substantially coplanar at a sealing area defined thereon and outside surfaces of said roof support and said second flange of said horizontal support are substantially aligned at a sealing area defined thereon;

a set of glass panes being adhered to said legs of said vertical supports and said first flanges of said horizontal supports at said defined sealing area; and a second set of glass panes being adhered to said roof supports and said second flanges of said horizontal supports at said defined sealing area.

5. A modular building having hexagonal sections, each hexagonal section having;

six vertical supports having Y-shaped cross-section formed from three legs equally spaced from each other;

one leg of each support forming an adhering surface for a panel of one side of the building;

a second leg of each support forming an adhering surface for a panel of an adjacent side of the building;

a third leg extending outward from the center of said building and forming an adhering surface for a panel;

an adjacent pair of said vertical supports forming two of the supports for an adjacent hexagonal section;

said two adjacent vertical supports having their third legs forming an adhering surface for panels of said adjacent hexagonal section;

six roof supports connected together at their inner ends and radially extending outwardly therefrom;

said roof supports having their outer ends in proximity to said first and second legs of said vertical supports;

six horizontal supports having first and second flanges extending substantially at right angles to each other;

said horizontal supports each having end sections where said first and second flanges are offset inwardly a thickness of said legs of said vertical support and a thickness of said roof support respectively and abutting inside surfaces of said respective leg and roof support such that outside surfaces of said leg and said first flange of said horizontal support are substantially coplaner at a sealing area defined thereon and the outside surfaces of said roof support and said second flange of said horizonal support are substantially aligned at a sealing area defined thereon;

said legs of said vertical supports and said first flanges of said horizontal supports at said defined sealing area being constructed to adheringly support a set of glass panes; and said roof supports being constructed to adheringly support a second set of glass panes.

6. A construction joint for a greenhouse to provide flat and aligned adhering surfaces for adherence of glass panes thereto, said construction joint comprising;

a first support formed from a first and second leg having a common edge;

a second support having an outer end in proximity with inner walls of said first and second leg of said first support;

a third and fourth support each having first and second flanges, said flanges having a common edge;

said third and fourth support each having an end section where said first and second flanges are offset a distance approximately equal to the thickness of said legs of said first support and a distance approximately equal to thickness of said second support respectively;

said end sections of said first and second flanges of said third support abutting inside surfaces of said first leg and second support respectively, and said end sections of said first and second flanges of said fourth support abutting inside surfaces of said second leg and said second support respectively such that outside surfaces of said legs and said first flange of said third and fourth supports are substantially coplanar at a sealing area defined thereon and outside surfaces of said second support and said second flange of said third and fourth supports are substantially coplanar at a sealing area defined thereon.

* * * * *